United States Patent [19]
Yoshino

[11] Patent Number: 5,358,810
[45] Date of Patent: Oct. 25, 1994

[54] METHOD OF MANUFACTURING LIQUID CRYSTAL DISPLAY DEVICE

[75] Inventor: Thunekazu Yoshino, Kamakura, Japan

[73] Assignee: Kabushiki Kaisha Toshiba, Kawasaki, Japan

[21] Appl. No.: 156,796

[22] Filed: Nov. 23, 1993

Related U.S. Application Data

[63] Continuation of Ser. No. 824,881, Jan. 22, 1992, abandoned, which is a continuation of Ser. No. 493,310, Mar. 14, 1990, abandoned.

[30] Foreign Application Priority Data

Mar. 15, 1989 [JP] Japan .................................. 1-60742
Jul. 27, 1989 [JP] Japan ................................ 1-192503

[51] Int. Cl.$^5$ ............................................. G03C 5/00
[52] U.S. Cl. ........................... 430/20; 430/311; 430/321; 430/313; 430/330; 359/900
[58] Field of Search ............... 430/20, 311, 313, 316, 430/317, 318, 321, 322, 323, 330, 331; 350/334, 336, 339 R, 339 F; 156/667; 359/900

[56] References Cited

U.S. PATENT DOCUMENTS

| | | | |
|---|---|---|---|
| 4,776,675 | 10/1988 | Takaochi et al. | 430/20 |
| 4,948,706 | 8/1990 | Sugihara | 430/311 |
| 5,081,004 | 1/1992 | Vinouze | 430/20 |

FOREIGN PATENT DOCUMENTS

| | | | |
|---|---|---|---|
| 52-17375 | 5/1977 | Japan . | |
| 53-658 | 1/1978 | Japan . | |
| 61-3123 | 1/1986 | Japan . | |
| 63-70828 | 3/1988 | Japan | 430/20 |
| 63-180933 | 7/1988 | Japan . | |
| 63-180934 | 7/1988 | Japan . | |

*Primary Examiner*—Marion E. McCamish
*Assistant Examiner*—Kathleen Duda
*Attorney, Agent, or Firm*—Cushman, Darby & Cushman

[57] ABSTRACT

In a method of manufacturing a liquid crystal display device of this invention, a light transmittance of an overcoating layer of the liquid crystal display device is partially reduced to form a part of a light-shielding portion. Therefore, a color filter can be easily formed, and hence the device can be manufactured at high productivity and low cost.

14 Claims, 7 Drawing Sheets

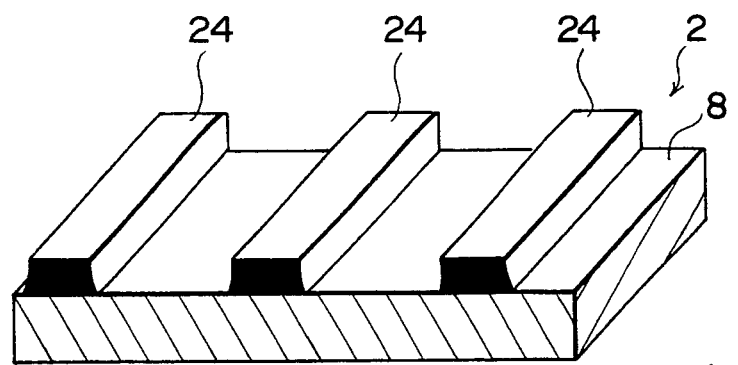
F I G. 3A
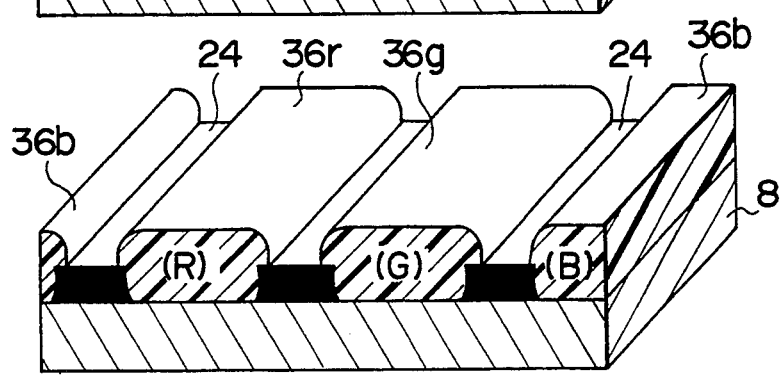
F I G. 3B
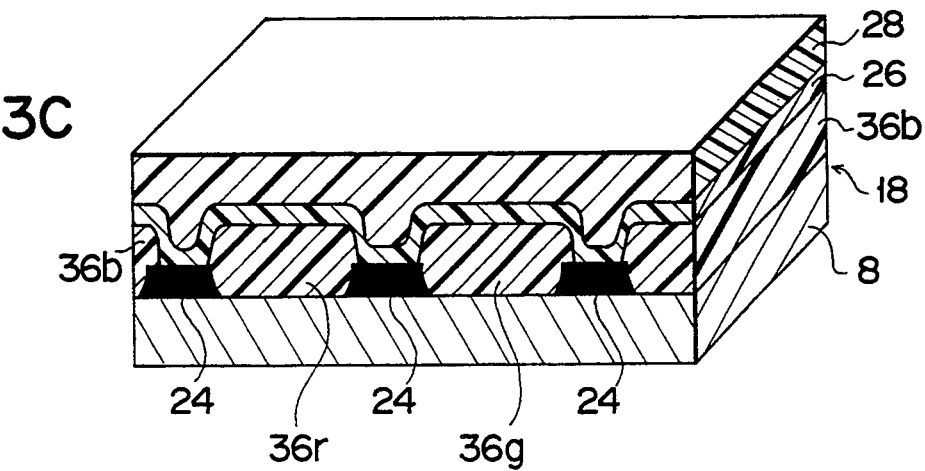
F I G. 3C

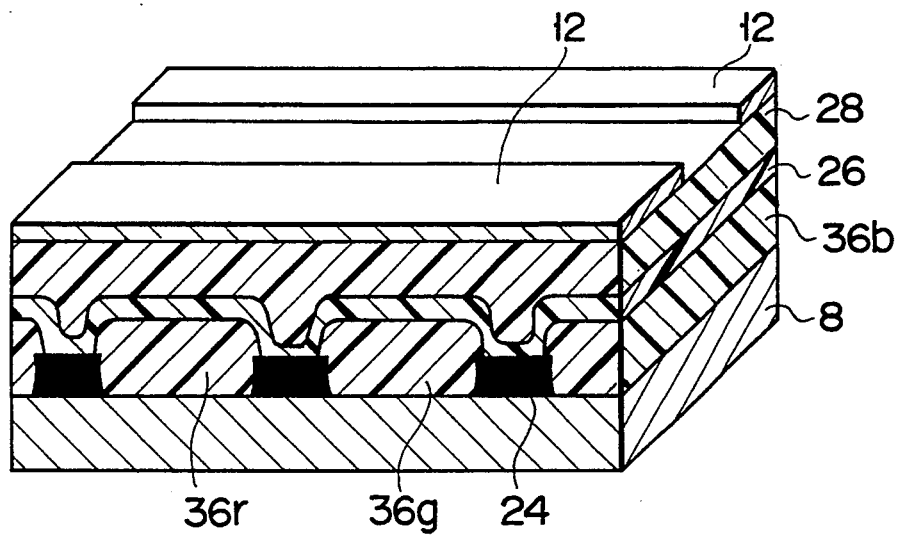
F I G. 3D
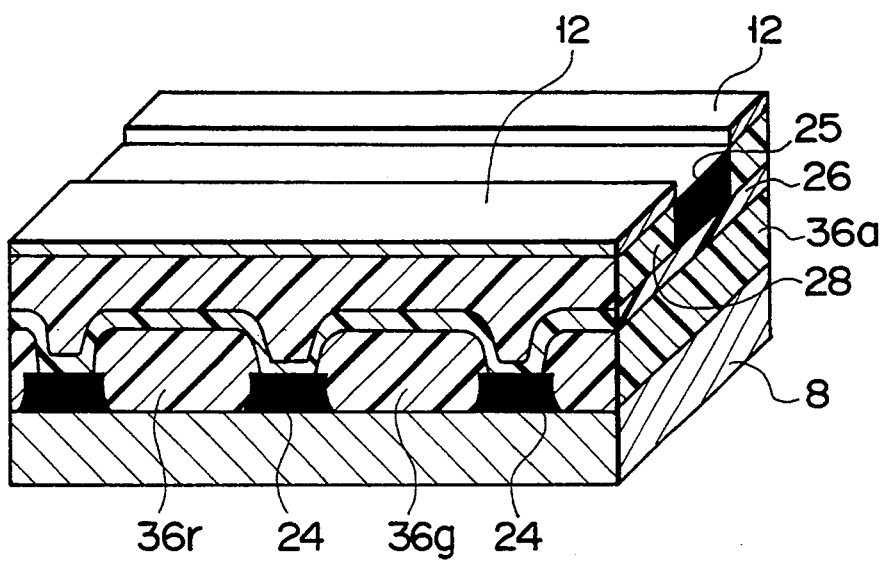
F I G. 3E

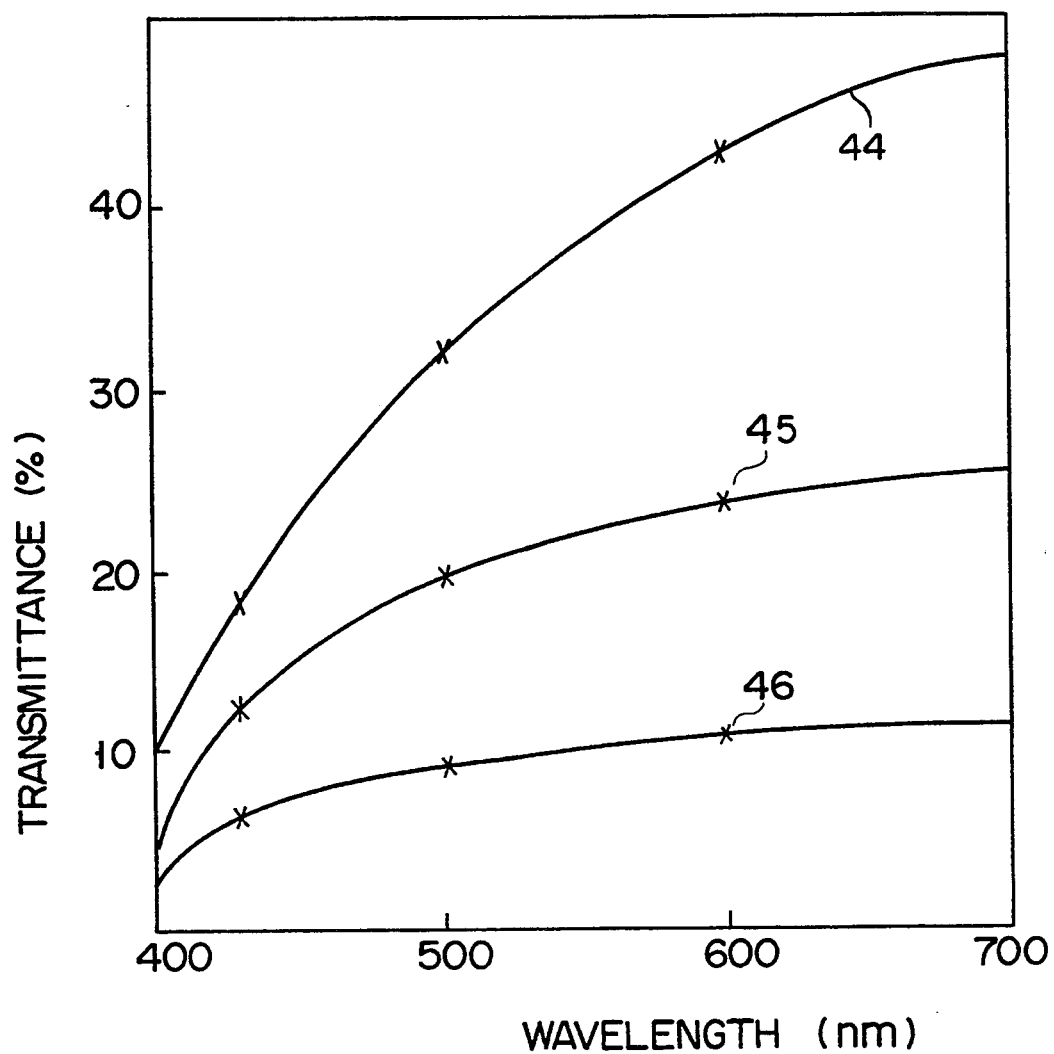
F I G. 4

METHOD OF MANUFACTURING LIQUID CRYSTAL DISPLAY DEVICE

This is a continuation of application Ser. No. 07/824,881, filed on Jan. 22, 1992, which was abandoned upon the filing hereof which is a continuation of 07/493,310, filed Mar. 14, 1990, now abandoned.

BACKGROUND OF THE INVENTION

1. Field of the Invention

The present invention relates to a method of manufacturing a liquid crystal display device and, more particularly, to a method of manufacturing a color filter for a liquid crystal display device.

2. Description of the Related Art

In recent years, a liquid crystal display device has been widely utilized as a display for, e.g., a television or office automation equipment. This is because a liquid crystal display device has advantages of, e.g., low power consumption and light weight. In a liquid crystal display device having the above advantages, a demand has arisen for achieving larger size and high-quality color display. With this demand, a color filter for a liquid crystal display device is regarded as an important unit.

A conventional color filter for a liquid crystal display device has been manufactured by repeating the photolithography step. Since each pixel of the liquid crystal display device is extremely small, a high-precision color filter for the liquid crystal display device is required. In addition, the color filter must have excellent surface properties to form, e.g., an orientation film thereon. For this reason, high precision is required, and hence the manufacture by repeating the photolithography step results in poor productivity. In addition, the surface of the color filter must be flattened to form, e.g., an orientation film thereon. For this reason, cost of the liquid crystal display device is increased, and cost of an equipment including the liquid crystal display device is also extremely increased, as a matter of course.

In order to eliminate the above drawbacks, a printing method which can achieve the manufacture of a liquid crystal display device at lower cost than that of a dyeing method has been considered. In the printing method, a color filter or the like is manufactured by printing. However, foreign matters such as dust easily enter a color filter manufactured by the printing method. In addition, the surface of the color filter tends to be uneven due to the manufacturing method by printing. If the surface of the color filter is extremely uneven, it is difficult to form a transparent electrode or an orientation film on the color filter, thus easily degrading the display quality. For this reason, the conventional color filter manufactured by printing is impractical in spite of low cost.

In order to solve the above problems, a method is disclosed in Published Unexamined Japanese Patent Application No. 61-3123. According to this method, since the surface of a color portion formed by printing is polished and flattened, a color filter which does not adversely affect a transparent conductive film or the like can be manufactured. More specifically, the above application discloses a method of manufacturing a liquid crystal color display element, including the steps of printing and forming opaque portions on a substrate surface at predetermined intervals, printing color portions between the adjacent opaque portions, and polishing and flattening the color portions. According to this method, even if the surfaces of the color portions are uneven after the color portions are formed, the surfaces can be flattened by polishing, thus manufacturing a color filter suitable for a liquid crystal display device.

In order to improve contrast, however, a light-shielding portion in which a plurality of straight lines are arranged in a matrix form is formed in peripheral portions of pixels of the liquid crystal display device. When this light-shielding portion is micropatterned by the above printing method, printing ink easily spreads around the intersecting portions at which the straight lines cross each other at right angles because of the printing characteristics. For this reason, the light-shielding portion undesirably spreads to enter the light-transmitting portion, resulting in a defective liquid crystal display device. Therefore, a production yield of the liquid crystal display devices is degraded. As a result, in the conventional color filter for the liquid crystal display device, all the steps cannot be performed by the printing method, but a photolithography technique is employed.

SUMMARY OF THE INVENTION

It is an object of the present invention to provide a method of manufacturing a liquid crystal display device which can be mass-produced at low cost because a high-quality light-shielding portion of a color filter can be formed by a printing method.

According to the present invention, there is provided a method of manufacturing a liquid crystal display device, comprising: the step of forming a plurality of color portions on a light-transmitting substrate and forming first light-shielding portions between the adjacent color portions; the step of forming an overcoating layer on the color and first light-shielding portions; the step of forming a plurality of transparent electrodes each having a predetermined shape on the overcoating layer; and the thermal treating step of reducing a light transmittance of the overcoating layer on which no electrode is formed between the plurality of transparent electrodes to form second light-shielding portions.

According to the present invention, peripheral portions of pixels are covered with the light-shielding portions with high precision. Therefore, a sufficient light-shielding effect can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3E are perspective sectional views for explaining the manufacturing steps of the manufacturing method according to the first embodiment of the present invention;

FIG. 4 is a graph showing a light transmittance of an epoxy resin in the first embodiment of the present invention;

DETAILED DESCRIPTION OF THE PREFERRED EMBODIMENTS

An embodiment of the present invention will be described hereinafter with reference to the accompanying drawings.

Figure 1:
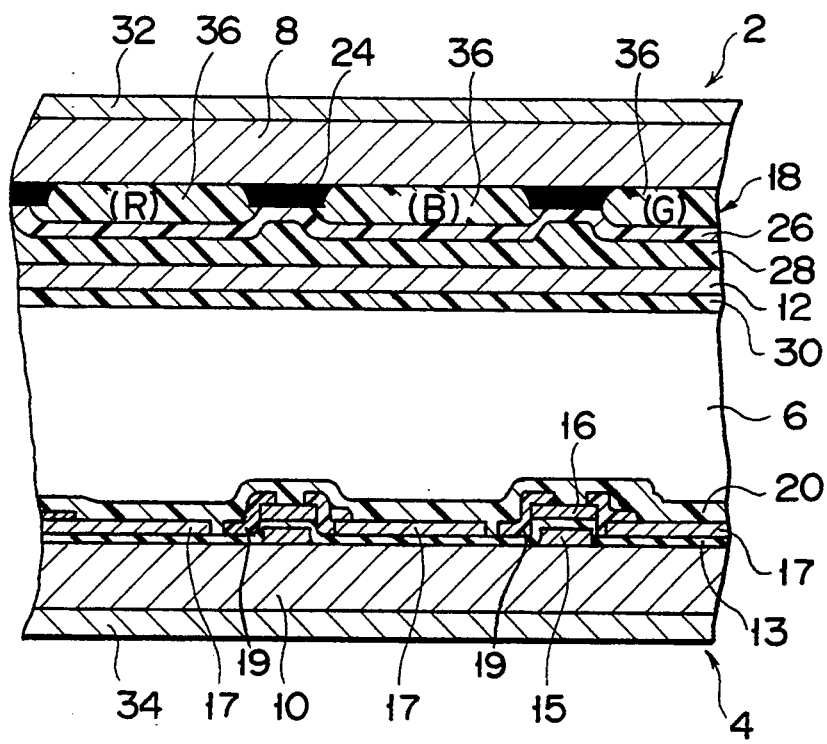
FIG. 1 is a sectional view of a part of a liquid crystal display device manufactured by a manufacturing method according to a first embodiment of the present invention.
Figure 2:
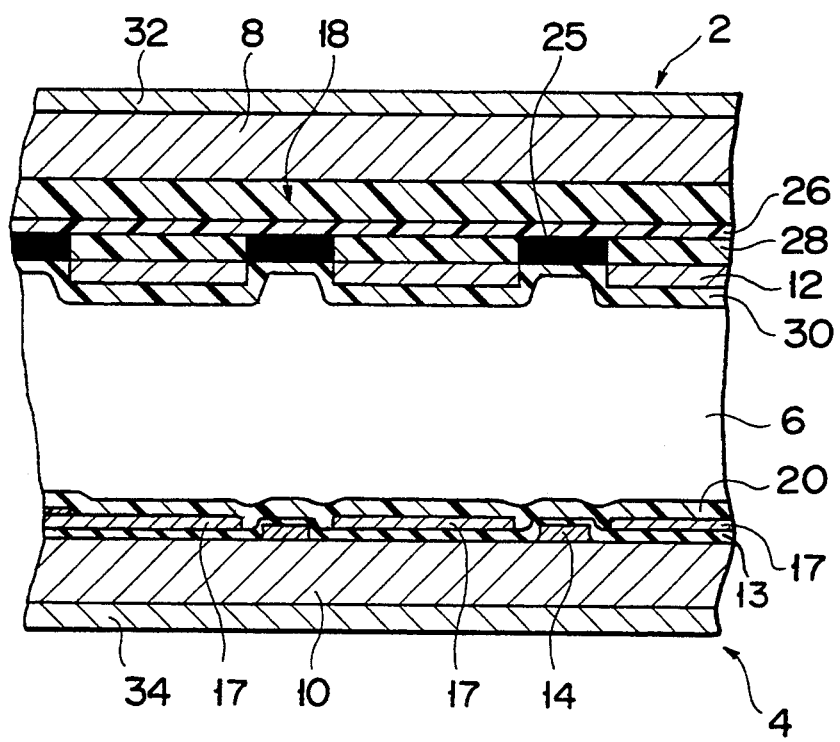
FIG. 2 is a sectional view of a part of the liquid crystal display device manufactured by the manufacturing method according to the first embodiment of the present invention, which is taken along a direction perpendicular to the direction of the section in FIG. 1.

FIGS. 1 and 2 show a liquid crystal display device manufactured by a manufacturing method according to an embodiment of the present invention. In this embodiment, a light-transmitting type active matrix liquid crystal display device is exemplified. This liquid crystal display device includes first and second electrode substrates 2 and 4, and a liquid crystal composition 6 sandwiched between the electrode substrates 2 and 4. These electrode substrates 2 and 4 include light-transmitting substrates 8 and 10 made of glass, respectively. In the first electrode substrate color filters 18 are formed on the light-transmitting substrate 8. Light-shielding layers 24 are formed between the adjacent color filters 18. An adhesive layer 26 is formed on the color filters 18. An overcoating layer 28 is formed on the adhesive layer 26. First transparent electrodes 12 are formed on the overcoating layer 28. An orientation film 30 is formed on the first transparent electrodes 12 to orient a liquid crystal. In the second electrode substrate 4, thin-film transistors 16 each having a gate electrode 15 are formed on the light-transmitting substrate 10. An insulating layer 13 is formed around the transistors 16. Transparent pixel electrodes 17 are formed on the insulating layer 13. An orientation film 20 is formed on the electrode substrate surfaces of the pixel electrodes 17. Polarizing films 32 and 34 are formed on the outer surfaces of the light-transmitting substrates 8 and 10, respectively.

A detailed arrangement of the first electrode substrate 2 will be described hereinafter. First light-shielding portions 24 patterned into a stripe shape with a relatively low light transmittance are formed on the light-transmitting substrate 8 at predetermined intervals. A plurality of color portions 36 which constitute the color filter 18 are formed between the adjacent light-shielding portions 24. The adhesive layer 26 is formed on the color filter 18 to achieve excellent adhesion, and the overcoating layer 28 is formed thereon. The first transparent electrodes 12 having a stripe shape are formed on the overcoating layer 28 to be perpendicular to the direction of the stripes of the first light-shielding portions 24. Parts of the overcoating layer 28 are formed as second light-shielding portions 25 each having a reduced transmittance shown in FIG. 2. In addition, the orientation film 30 is formed on the first transparent electrodes 12.

A detailed arrangement of the second electrode substrate 4 will be described hereinafter. A plurality of scanning electrodes 14 and signal electrodes 19 which are perpendicular to each other are formed on the light-transmitting substrate 10. A thin-film transistor 16 is arranged as an active element at each intersecting point between the corresponding scanning and signal electrodes. Each thin-film transistor 16 has a gate electrode 15. The plurality of pixel electrodes 17 are formed to be in contact with these thin-film transistors 16. The orientation film 20 is formed on the transparent electrode 17.

A method of manufacturing the liquid crystal display device will be described hereinafter with reference to FIGS. 3A to 3E.

The first electrode substrate 2 is shown in FIG. 3A. The first light-shielding films 24 each having a width of 20 μ are formed on the light-transmitting substrate 8 at 90 μ intervals by a printing method. In this printing method, a water-free flat board which is easy to handle is used as a printing board. In order to form the light-shielding films 24, a paint including carbon black is used. The thickness of each first light-shielding film 24 normally falls within the range of 1.5 to 2.0 μ although it depends on the concentration of a pigment. Thereafter, the first light-shielding films 24 are baked and hardened.

Thereafter, as shown in FIG. 3B, color portions 36r, 36g, and 36b which respectively correspond to red, green, and blue are printed into a stripe shape between the adjacent first light-shielding films 24 using a printing board having a width of 100 μ. Upon printing of each color, the films 24 are baked and hardened. A water-free flat board is also used in this printing step.

As shown in FIG. 3C, the adhesive layer 26 made of an epoxy resin used in the subsequent step and an acrylic resin having an excellent wet property is formed on the color filter 18. The thickness of the adhesive layer 26 is 0.1 μ. The overcoating layer 28 consisting of an epoxy resin is formed on the adhesive layer 26. The thickness of the overcoating layer is 2.0 μ. The surface of the above-mentioned color filter is uneven, i.e., the thickness of the color filter falls within the range of about 2.0 to 3.0 μ. Therefore, the overcoating layer 28 is formed to have a thickness of 2.0 to 3.0 μ, and the surface thereof is flattened. When the thickness of the overcoating layer 28 is below 2.0 μ the surface of the overcoating layer is not perfectly flat. In addition, when the thickness of the overcoating layer 28 exceeds 10 μ, the thickness of the first electrode substrate is increased, and hence non-modulated light is generated to cause a degradation in contrast. Therefore, the thickness of the adhesive layer 26 is decreased as small as possible, i.e., 0.1 to 0.2 μ in consideration of the adhesion strength. Note that an epoxy resin having a particularly high oxygen-shielding capability is selected as a material of the overcoating layer 28. The epoxy resin having a high oxygen-shielding capability prevents oxidation of the color filter 18 to achieve excellent spectral characteristics for a long time of period.

After the above steps are completed, the transparent electrode 12 is formed on the overcoating layer 28. For this purpose, the first electrode substrate 2 is arranged in a magnetron sputtering apparatus (not shown), and an I.T.O. (indium tin oxide) is formed to have a thickness of 500 Å. As shown in FIG. 3D, the first transparent electrode 12 is patterned into s stripe shape perpendicular to the first light-shielding film 24.

In this patterning step, e.g., a positive resist (OFPR-800 available from TOKYO OHKA KOGYO CO., LTD.) is coated. Thereafter, the patterned electrode is exposed and developed into a predetermined shape, and is dipped into an HCl-based etchant containing $Fe_2Cl_3$, thus etching it. In addition, the resist film is removed to form a pattern.

As shown in FIG. 3E, the first transparent electrode 12 and the overcoating layer 28 are thermally treated in an atmosphere at 250° C. for one hour. Upon this thermal treatment, the overcoating layer 28 on which the first transparent electrodes 12 are not formed reacts with oxygen, and is gradually turned into black to decrease a light transmittance. Thus, the second light-shielding portions 25 are formed. Note that, in the overcoating layer 28 on which the first transparent electrodes 12 are formed, a change such as a decrease in light transmittance does not occur because heat resistance is high and oxygen is shielded by the first transparent electrodes 12.

The light transmittance of the overcoating layer 28 is shown in FIG. 4. FIG. 4 shows a light transmittance of an epoxy resin thermally treated in an atmosphere at 250° C. for one hour. The axis of ordinate represents a light transmittance, and the axis of abscissa represents a wavelength of the transmitted light. Curves 44, 45, and 46 in FIG. 4 respectively represent light transmittances when the thicknesses of the epoxy resin are 1.0, 2.0, and 4.0 $\mu$. Since the thickness of the epoxy resin which constitutes the overcoating layer 28 in this embodiment is 2.0 $\mu$, the light transmittance is represented by the curve 45. When the liquid crystal display device in this embodiment is used in, e.g., a display of a computer, back light is often used as illumination light from a rear portion of the display. A three-wavelength fluorescent tube is normally used as the back light. In this three-wavelength fluorescent tube, a color temperature is set within the range of 5000° to 10,000° K. For this reason, a light-shielding effect of the epoxy resin is determined by a light-absorbing effect in a short-wavelength region having a larger energy than that in a long-wavelength region. Referring to FIG. 4, it is understood that the epoxy resin having a thickness of 1.0 $\mu$ exhibits a sufficient light-shielding effect. Since the thickness of the epoxy resin which constitutes the overcoating layer 28 in this embodiment is 2.0 $\mu$, a sufficient light-shielding effect can be obtained.

As described above, when the first light-shielding films 24 and the second light-shielding films 25 perpendicular to the first light-shielding films 24 are formed, the light-shielding portions in a matrix form can be arranged substantially in the pixel portions with high precision.

Thereafter, the orientation film 30 consisting of a high polymer resin is coated, and the resultant structure is baked. Since an epoxy resin having an excellent oxygen-shielding capability is used for the overcoating layer 28, the orientation film 30 can be baked at a sufficiently high temperature. Since the conventional limitation of the baking temperature because of heat resistance of the color portions need not be considered, the high-temperature baking can be achieved, thus improving productivity and a production yield.

The first electrode substrate 2 manufactured as described above and the second electrode substrate 4 manufactured in another process are arranged to be opposite to each other, and their peripheral portions are sealed by a sealing agent. The liquid crystal composition 6 to which a chiral agent is added is injected between the sealed electrodes. The first transparent electrode 12 or the signal and scanning electrodes (not shown) are individually connected to an electrode driving means, thus completing the liquid crystal display device.

In the above-mentioned liquid crystal display device, the first and second light-shielding portions 24 and 25 each having a stripe shape are perpendicular to each other, thus forming a light-shielding matrix. For this reason, the conventional matrix of light-shielding portions is not required, and hence pixel portions around the portions in which the light-shielding portions cross each other at right angles are not painted solid upon printing. In addition, when the second light-shielding portions are formed using the first transparent electrode 12 as a mask, the light-shielding portions can be formed in peripheral portions of the pixels with high precision.

Furthermore, since only one photolithography step is required to form the transparent electrode, i.e., a plurality of photolithography steps are not required, a liquid crystal display device can be manufactured at high productivity.

An epoxy resin is preferably used as the transparent resin in this invention for the following reason. For example, an acrylic resin is often wrinkled when an electrode is formed by sputtering. In addition, since the acryl resin does not have a capability to shield an outer air, the color filter is quickly degraded due to, e.g., oxygen.

Although various methods such as an electroforming method, a dyeing method, and a pigment dispersion method can be employed to manufacture the color portions in the present invention, a printing method is preferably used. This is because the color portions manufactured by the printing method have high heat resistance and productivity. When a pigment is properly selected, a high heat resistance of, e.g., 200° C. or more, can be obtained.

In this embodiment, the first transparent electrode is formed into stripes to form the second light-shielding portions. However, in order to prevent an adverse effect due to disconnection of the first transparent electrode, e.g., an I.T.O. may be repeatedly formed on the first transparent electrode by sputtering. The thickness of the I.T.O. is 100 to 200 Å.

In the above embodiment, an epoxy-based resin having an excellent oxygen-shielding capability is used for the overcoating layer. This prevents oxidation and degradation of the color filter to maintain excellent spectral characteristics of the color filter for a long period of time.

In the above embodiment, the second light-shielding portion which is not directly in contact with the first light-shielding portion is arranged. This causes an improvement of a production yield of the device because the second light-shielding portion may be aligned to be perpendicular to the first light-shielding portion. However, the present invention is not limited to this, and only the first light-shielding portion may be arranged. In addition, the following structure can also be achieved. Each first transparent electrode is formed into an island-shape corresponding to a pixel, and the overcoating layer is formed around each island by a thermal treatment. The color of the overcoating layer is changed into black in a matrix form. Thereafter, a transparent thin conductive film is formed again on the entire surface or into a stripe shape so that the island-shaped transparent electrodes are electrically connected to each other.

According to the method of manufacturing a liquid crystal display device of the present invention, in particular, the color filter can be easily manufactured. Therefore, the productivity can be improved, and the liquid crystal display device can be manufactured at low cost. In addition, since the liquid crystal display device manufactured by the method according to the present invention has excellent heat resistance and durability, a high image quality can be obtained for a long period of time.

Although the foregoing description of the above embodiment has been given with reference to a light-transmitting type active matrix liquid crystal display device, this invention is not restricted to this particular type. For instance, this invention may be applied to a simple matrix liquid crystal display device in which the electrode 14 of the second electrode substrate 4 in the embodiment is formed to have a stripe shape whose direction is perpendicular to the stripe pattern of the first transparent electrode 12 of the first electrode substrate 2.

Further, in the latter case of the simple matrix liquid crystal display device, stripe-shaped light-shielding portions perpendicular to each other may be formed by providing a resin layer as an undercoating layer of the stripe-shaped transparent electrode on the first electrode substrate which provides color portions and the second electrode substrate which does not provide color portions, and subjecting the resin layer exposed from the stripe-shaped transparent electrode to a thermal treatment to change its color.

The second embodiment of the present invention will now be described referring to FIGS. 5 and 6A through 6D.

Figure 5:
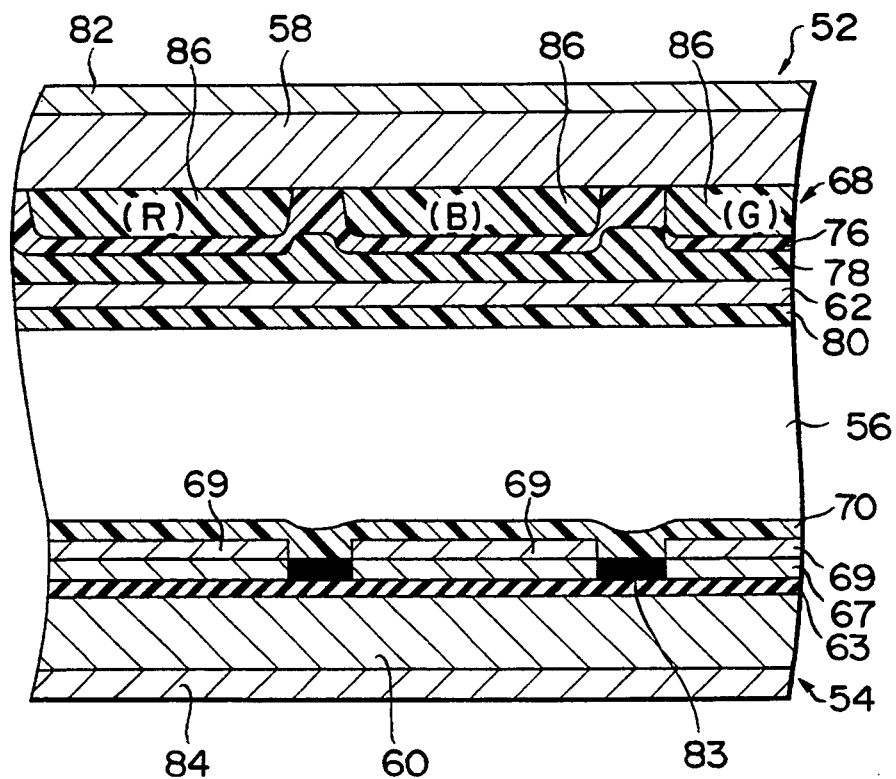
FIG. 5 is a sectional view of a part of a liquid crystal display manufactured by a manufacturing method according to a second embodiment of the present invention.

FIG. 5 is a schematic sectional view of, particularly, a liquid crystal cell portion of a simple matrix liquid crystal display device manufactured by the method according to the second embodiment. The following description of this embodiment will be given with reference to this liquid crystal display device.

A liquid crystal cell of this liquid crystal display device is constituted by a liquid crystal composition 56 sandwiched between first and second electrode substrates 52 and 54 provided by respectively forming first and second transparent electrodes 62 and 69 on a pair of light-transmitting substrates 58 and 60, each made of glass. Polarizing plates 82 and 84 are respectively arranged on those faces of the electrode substrates 52 and 54 which do not sandwich the liquid crystal composition 56. The individual electrode substrates 52 and 54 of this liquid crystal cell are connected to driving means (not shown) for applying a display voltage to the individual electrodes, thereby providing the liquid crystal display device of this embodiment.

The first electrode substrate 52 is constituted as follows.

A color filter 68 having a plurality of stripe-shaped color portions 86 is arranged on the light-transmitting substrate 58 at predetermined intervals. An overcoating layer 78 is disposed through an adhesive layer 76 on the color filter 68, and the stripe-shaped first transparent electrode 62 is arranged on this overcoating layer 78 as to be perpendicular to the color portions.

The color of that portion of the overcoating layer 78 which corresponds to the portion between stripes of the first transparent electrode 62 is changed into black to thereby form first light-shielding portions 75. An orientation film 80 is then disposed on the first transparent electrode 62; the resultant structure is the first electrode substrate 52.

Regarding the second electrode substrate 54, the stripe-shaped transparent electrode 69 is formed through an adhesive layer 63 and an undercoating layer 67 on the light-transmitting substrate 60. The color of that portion of the undercoating layer 67 which corresponds to the portion between stripes of the transparent electrode 69 is changed into black to thereby form second light-shielding portions 83. An orientation film 70 is formed on the transparent electrode 69 and the second light-shielding portions 83.

A method of manufacturing the liquid crystal display device will be described below referring to FIGS. 6A to 6D.

Figure 6A:
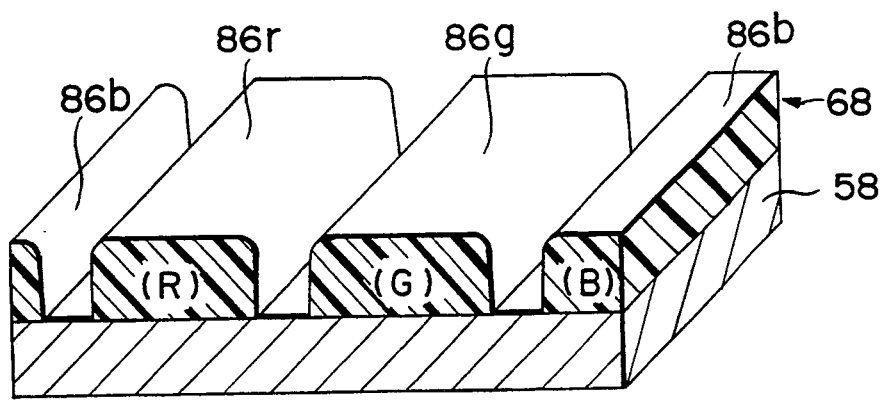
FIGS. 6A to 6D are perspective sectional views for explaining the manufacturing steps of the manufacturing method according to the second embodiment of the present invention.

As shown in FIG. 6A, color portions 86r, 86g and 86b which respectively correspond to red, green and blue, are printed into a stripe shape for each color at intervals of 110 μ using a printing board having a width of 100 μ. Upon printing of each color, the first light-shielding portions 75 are baked to harden the ink, thereby providing the color filter 68. A water-free flat board, which is easy to handle and has a sufficient pattern, is used as the printing board.

Figure 6B:
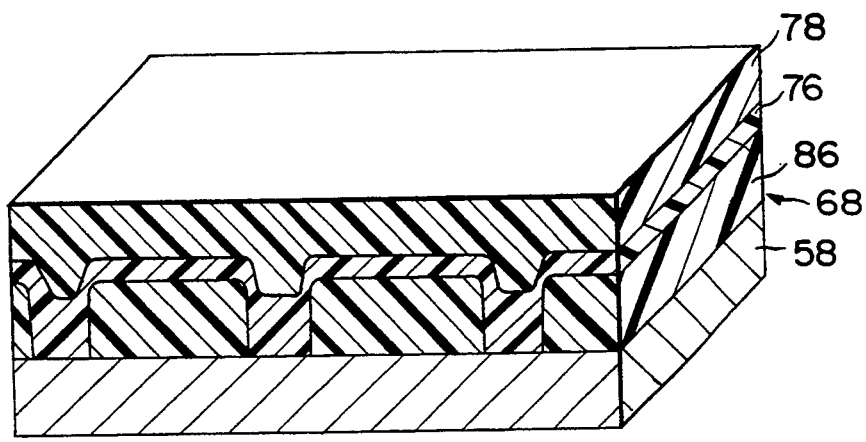

Then, as shown in FIG. 6B, an epoxy resin used in the subsequent step and an acrylic resin having an excellent wet property are formed 0.1 μ thick as the adhesive layer 76 on the color filter 68. The overcoating layer 78 consisting of an epoxy resin is formed 2.0 μ thick on this adhesive layer 76.

In this example, an epoxy-based resin is used for the overcoating layer 78; of epoxy-based resins, one having an excellent oxygen-shielding capability is selected. Providing the overcoating layer 78 with an excellent oxygen-shielding capability can prevent oxidation and degradation of the color filter 68 to maintain excellent spectral characteristics of the color filter for a long period of time.

Figure 6C:
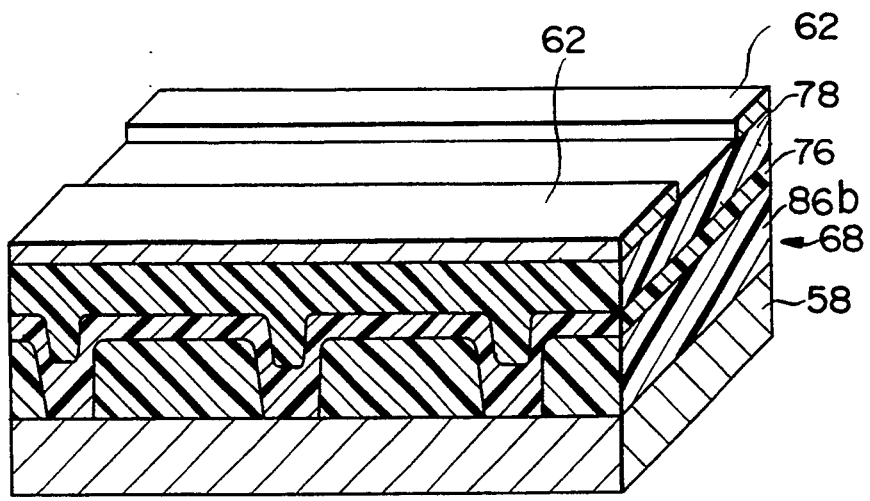

After the above steps are completed, the transparent electrode 62 is formed on the overcoating layer 78. For this purpose, the first electrode substrate 52 is arranged in a magnetron sputtering apparatus (not shown), and an I.T.O. is formed to have a thickness of 2000 Å. As shown in FIG. 6C, the first transparent electrode 62 is patterned into a stripe shape with openings perpendicular to the stripe-shaped color portions.

In this patterning step, e.g., a positive resist (OFPR-800 available from TOKYO OHKA KOGYO CO., LTD.) is coated. Thereafter, the patterned electrode is exposed and developed into a predetermined shape, and is immersed into an HCl-based etchant containing $Fe_2Cl_3$, thus etching it. In addition, the resist film is removed to form a pattern.

Figure 6D:
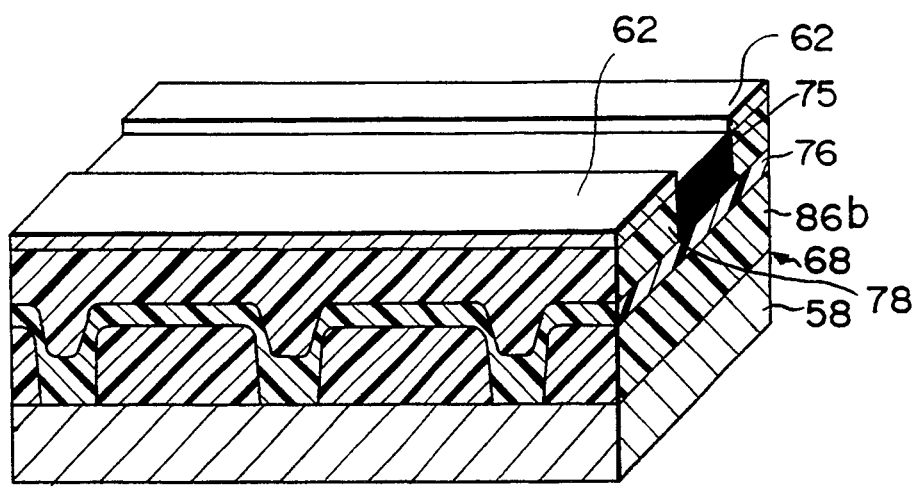

Then, the surface of the thus produced first transparent electrode 62 is thermally treated in an atmosphere at 250° C. for one hour. This thermal treatment causes that region of the overcoating layer 78 on which the first transparent electrodes 62 are not formed, to react with oxygen to be gradually turned into black, thus forming the first light-shielding portions 75 as shown in FIG. 6D. The color of that region of the overcoating layer 78 which has the first transparent electrodes 62 formed thereon is not changed because this region has a high heat resistance and the first transparent electrodes 62 can shield oxygen.

The first light-shielding portions 75 having a stripe shape, when formed in the above manner, are aligned in one direction to substantially separate the pixel portions.

Thereafter, the orientation film 80 consisting of a polymer resin is coated, and the resultant structure is baked to thereby form the first electrode substrate 52. Since an epoxy resin having an excellent oxygen-shielding capability is used for the overcoating layer 78, the orientation film 80 can be baked at a sufficiently high temperature unlike in the prior art which requires the baking at a low temperature. This can therefore improve the productivity and yield.

A description of the second electrode substrate will now be given.

The second electrode substrate 54 has the same structure as the first electrode substrate 52 without the color filter. As shown in FIG. 5, an epoxy resin used in the subsequent step and an acrylic resin having an excellent wet property are formed 0.1 $\mu$ thick as the adhesive layer 63 on the light-transmitting substrate 60. The undercoating layer 67 consisting of an epoxy resin is formed 2.0 $\mu$ thick on this adhesive layer 63.

After the above steps are completed, the transparent electrode 69 is formed on the undercoating layer 67. For this purpose, the second electrode substrate 54 is arranged in a magnetron sputtering apparatus (not shown), and an I.T.O. is formed to have a thickness of 2000 Å. The transparent electrode 69 is patterned into a stripe shape with openings perpendicular to the stripe-shaped first transparent electrode 62.

Then, the thus produced substrate is thermally treated in an atmosphere at 250° C. for one hour. This thermal treatment causes that region of the undercoating layer 67 on which the transparent electrodes 69 are not formed, to react with oxygen to be gradually turned into black, thus forming the second light-shielding portions 83. The color of that region of the undercoating layer 67 which has the transparent electrodes 69 formed thereon is not changed because this region has a high heat resistance and the transparent electrodes 69 can shield oxygen.

The stripe-shaped first light-shielding portions 75 and the stripe-shaped second light-shielding portions 83 perpendicular to the former portions, when formed in the above manner, can provide light-shielding portions substantially in a matrix pattern around the pixel portions.

Thereafter, the orientation film 70 consisting of a polymer resin is coated, and the resultant structure is baked to thereby form the second electrode substrate 54.

The first electrode substrate 52 and second electrode substrate 54 manufactured as described above are arranged to face each other, and their peripheral portions are sealed by a sealing agent to provide a liquid crystal cell. The liquid crystal composition 56 having a chiral agent added to the liquid crystal material, is sandwiched between both electrodes. Further, the first and second transparent electrodes 62 and 69 are individually connected to electrode driving means (not shown), thus completing the liquid crystal display device.

In the liquid crystal display device according to this embodiment, the first and second light-shielding portions 75 and 83 each having a stripe shape are formed to be perpendicular to each other, thus forming a light-shielding matrix. This does not require printing of a matrix pattern with opening portions, unlike in the prior art, so that the opening portions need not be painted solid, thus significantly improving the production yield. In addition, when the first and second light-shielding portions 75 and 83 are formed using the first and second transparent electrodes 62 and 69 as masks, the light-shielding portions can be formed at the peripheral portions of the pixels with high precision.

Furthermore, since a number of photolithograph steps are not required, a liquid crystal display device can be manufactured at high productivity.

Although the transparent electrodes of the first electrode substrate are formed to be perpendicular to the stripes of the color portions in this embodiment, these electrodes may be formed in parallel to the stripes. In this case, the transparent electrodes of the second electrode substrate should naturally be formed to be perpendicular to the first transparent electrodes.

As described in detail above, the present method of manufacturing a liquid crystal display device can improve the productivity at low cost by facilitating the fabrication of particularly the color filter portion. The liquid crystal display device manufactured by the method of the present invention has excellent heat resistance and durability and can thus display a high-quality image for a long period of time.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing an electrode substrate for a liquid crystal display device comprising the steps of:
   forming a plurality of color portions on a light-transmitting substrate and light-shielding portions between said color portions on said light-transmitting substrate;
   forming a transparent resin layer on said color and light-shielding portions;
   forming a plurality of transparent electrodes each having a predetermined shape, on said transparent resin layer; and
   heating said transparent resin layer in an atmosphere containing oxygen, thereby blackening regions of said transparent resin layer on which said transparent electrodes are not formed.

2. A method according to claim 1, wherein said step of forming a plurality of color portions on a light-transmitting substrate and light-shielding portions between said color portions includes printing colored ink on said light-transmitting substrate.

3. A method according to claim 1, wherein said color portions and light-shielding portions are formed in a striped pattern, and said transparent electrodes are formed in a striped 4. A method according to claim 1, wherein said resin layer is epoxy.

5. A method according to claim 4, wherein said resin layer has a thickness equal to or greater than 1 $\mu$m.

6. A method of manufacturing an electrode substrate for a liquid crystal display device, said method comprising the steps of:
   forming a plurality of color portions on a light-transmitting substrate;

forming a transparent resin layer on said color portions and said light-transmitting substrate;

forming a plurality of transparent electrodes, each having a predetermined shape, on said transparent resin layer; and heating said transparent resin layer in an atmosphere containing oxygen thereby blackening regions of said resin layer on which said transparent electrodes are not formed.

7. A method according to claim 6, wherein said color portions are formed in a striped pattern and said transparent electrodes are formed in a striped pattern in a direction which intersects with said striped pattern of said color portions.

8. A method according to claim 6, wherein said color portions are formed in a striped pattern and said transparent electrodes are formed in a striped pattern in a direction parallel to said striped pattern of said color portions.

9. A method according to claim 6, wherein said resin layer is epoxy.

10. A method according to claim 9, wherein said resin layer has a thickness equal to or greater than 1 $\mu$m.

11. A method of manufacturing an electrode substrate for a liquid crystal display device, said method comprising the steps of:

forming a transparent resin layer on a transparent substrate;

forming a plurality of transparent electrodes, each having a predetermined shape, on said transparent resin layer; and heating said transparent resin layer in an atmosphere containing oxygen, thereby blackening regions of said resin layer on which said transparent electrodes are not formed to reduce the light-transmittance of said regions.

12. A method according to claim 11, wherein said regions and said transparent electrodes are formed into stripe patterns.

13. A method according to claim 11, wherein the step of forming said resin layer includes forming a transparent resin layer that is approximately 2.0 to 3.0 $\mu$m thick.

14. A method according to claim 11, wherein the step of forming a plurality of transparent electrodes includes forming said transparent electrodes so that said electrodes are approximately 2000 Å thick.

* * * * *